(12) United States Patent
Lin et al.

(10) Patent No.: US 7,835,542 B2
(45) Date of Patent: Nov. 16, 2010

(54) OBJECT TRACKING SYSTEMS AND METHODS UTILIZING COMPRESSED-DOMAIN MOTION-BASED SEGMENTATION

(75) Inventors: Chia-Wen Lin, Chiayi County (TW); Zhi-Hong Ling, Kaohsiung City (TW); Kual-Zheng Lee, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 1213 days.

(21) Appl. No.: 11/419,600

(22) Filed: May 22, 2006

(65) Prior Publication Data

US 2007/0154066 A1 Jul. 5, 2007

Related U.S. Application Data

(60) Provisional application No. 60/754,915, filed on Dec. 29, 2005.

(51) Int. Cl.
*G06K 9/00* (2006.01)
(52) U.S. Cl. ...................................... 382/103
(58) Field of Classification Search ................ 382/101, 382/103; 348/169–180, 154–155; 356/27–29
See application file for complete search history.

(56) References Cited

U.S. PATENT DOCUMENTS

| | | | |
|---|---|---|---|
| 6,394,557 B2 | 5/2002 | Bradski | |
| 6,499,025 B1 | 12/2002 | Horvitz et al. | |
| 6,590,999 B1 | 7/2003 | Comaniciu et al. | |
| 6,711,278 B1 | 3/2004 | Gu et al. | |
| 6,826,292 B1 | 11/2004 | Tao et al. | |
| 6,882,959 B2 | 4/2005 | Rui et al. | |
| 6,901,110 B1 | 5/2005 | Tsougarakis et al. | |
| 6,937,744 B1 | 8/2005 | Toyama | |
| 6,950,123 B2 | 9/2005 | Martins | |
| 7,356,082 B1* | 4/2008 | Kuhn | 375/240.16 |
| 7,376,246 B2* | 5/2008 | Shao et al. | 382/103 |
| 2007/0092244 A1* | 4/2007 | Pertsel et al. | 396/153 |

OTHER PUBLICATIONS

Hu, et al., IEEE Trans. Systems, Man, and Cybernetics-Part C: Applications and Reviews, "A survey on visual surveillance of object motion and behaviors", vol. 34, No. 3, pp. 334-352 (2004).

Comaniciu, et al., IEEE Trans. Pattern Analysis and Machine Intelligence, "Kernel-Based Object Tracking", vol. 25, No. 5, pp. 564-577 (2003).

Comaniciu, et al., Proc. IEEE Int. Conf. Computer Vision & Pattern Recognition, "Real-time tracking of non-rigid objects using mean shift", pp. 142-149 (2000).

(Continued)

*Primary Examiner*—Samir A. Ahmed
*Assistant Examiner*—Atiba O Fitzpatrick
(74) *Attorney, Agent, or Firm*—Alston & Bird LLP

(57) ABSTRACT

An object tracking method may include: receiving frames of data containing image information of an object; performing an object segmentation to obtain an object motion result; and using the object motion result to conduct an object tracking. In particular, the object segmentation may include: extracting motion vectors from the frames of data; estimating a global motion using the motion vectors; and subtracting the global motion from the motion vectors to generate an object motion result.

19 Claims, 7 Drawing Sheets

OTHER PUBLICATIONS

Isard, et al., Int. J. Computer Vision, "Conditional density propagation for visual tracking", vol. 29, No. 1, pp. 5-28 (1998).

Chang, et al., IEEE Signal Processing Letters, "Kernel particle filter for visual tracking", vol. 12, No. 3, pp. 242-245 (2005).

Maggio, et al., Proc. IEEE Int. Conf. Acoustics, Speech and Signal Processing, "Hybrid particle filter and mean shift tracker with adaptive transition model", pp. 3698-3701 (2005).

Deguchi, et al., Proc. IEEE Int. Conf. Computer Vision & Pattern Recognition, "Object tracking by the mean shift of regional color distribution combines with the particle-filter algorithm", pp. 506-509 (2004).

Su, et al., Proc. IEEE Int. Symp. Circuits Syst., "Global motion estimation from coarsely sampled motion vector field and the applications", pp. 628-631 (2003).

Jamrozik, et al., Proc. IEEE Int. Conf. Image Processing, "A Compressed domain video object segmentation system", pp. 113-116 (2002).

K. Nummiaro et al., "An Adaptive color-based particle filter," *Image and Vision Computing*, vol. 21, pp. 99-110, 2003.

* cited by examiner

OBJECT TRACKING SYSTEMS AND METHODS UTILIZING COMPRESSED-DOMAIN MOTION-BASED SEGMENTATION

CROSS-REFERENCE TO RELATED APPLICATIONS

This application claims the benefit of U.S. Provisional Application No. 60/754,915 filed Dec. 29, 2005 entitled "SEGMENTATION-GUIDED OBJECT TRACKING."

BACKGROUND OF THE INVENTION

1. Field of the Invention

The present invention relates to object tracking systems and methods. More particularly, the present invention relates to object tracking systems and methods capable of identifying one or more objects from images and tracking the movement of the object(s).

2. Background

Object tracking general refers to the technique of identifying one or more objects in an image or a series of images, including a video sequence, for various purposes. As an example, object tracking can apply to security, surveillance, and personnel, process, or production management applications. Typically, tracking methods can be divided into two main classes—bottom-up and top-down approaches. Under a bottom-up approach, an image is segmented into objects, which are used for object tracking. In contrast, a top-down approach generates object hypotheses and tries to verify them using the image contents. Mean-shift and particle filter are two common object tracking methods using the top-down approach.

In many applications, object representation may become an important part for an object tracking process. For example, a feature space, such as color histograms, edges or contour, may be chosen to describe a target, which typically may come from the first image of a series of images or a video. A color histogram can represent a target for object tracking as it achieves robustness against non-rigidity, rotation, and partial occlusion. In some examples, an elliptical area may be used as a tracking area, which may surround an object to be tracked. In some cases, to reduce computational complexity during a real-time processing, m-bin histograms may be used. In one example, the color histogram distribution p(y) at location y inside an elliptic region may be determined by the following:

$$p(y) = \{p_u(y)\}_{u=1,\ldots,m}, \quad (1)$$

$$p_u(y) = C_h \sum_{i=1}^{n_h} k\left(\left\|\frac{y - x_i}{h}\right\|^2\right) \delta[h(x_i) - u], \quad (2)$$

where $n_h$ represents the number of pixels in the region and $\delta$ denotes the Kronecker delta function. The parameter h is used to adapt the size of the region. The normalization factor $$C_h \left( \sum_{i=1}^{n_h} k\left(\left\|\frac{y - x_i}{h}\right\|^2\right) \right)^{-1}$$

ensures that $$\sum_{u=1}^{n_h} p_u(y) = 1 \text{ and}$$

and $$k(r) = \begin{cases} 1 - r^2 & r < 1 \\ 0 & \text{otherwise} \end{cases}.$$

To increase the reliability of the color distribution, smaller weights may be assigned to the pixels that are further away from the ellipse center as in Eq.(2).

A similarity function may define or identify the similarity between two targets. As an example, the Bhattacharyya distance is a similarity function used to measure the similarity between two color histogram probability distributions. It can be expressed:

$$d(p, q) = \sqrt{1 - \rho[p, q]}, \quad \rho(p, q) = \sum_{u=1}^{m} \sqrt{p_u, q_u}, \quad (3)$$

where $d(\cdot)$ is the Bhattacharyya distance, $\rho(\cdot)$ is the Bhattacharyya parameter, m is the number of bins, and $p_u$ and $q_u$ respectively represent u-bin histogram probabilities of a candidate target and an initial target model.

Mean shift is generally a recursive object tracking method. To locate an object in each frame, mean shift starts from the position of the tracking result in the previous frame and then follows a direction of increasing similarity function to identify the next recursion starting point. Recursion usually terminates when the gradient value approaches or becomes zero, with the point of termination as the tracking result, i.e. the new location of the object being tracked. The steps identified below illustrate an example of an iterative procedure of mean shift tracking method.

---

Given the target model $\{q_u\}_{u=1\ldots m}$ and its location $y_0$ in the previous frame.
1. Initialize the location of the target in current frame with $y_0$.
2. Caculate the weight according to Eq. (4).
3. Find the next location $y_1$ of the target candidate according to Eq. (5).
4. If $\|y_1 - y_0\| < \epsilon$, stop; else set $y_0 = y_1$ and go to step 2.

---

Under such approach, color histograms may be used to characterize a target and a Bhattacharyya distance function may be used to measure the similarity between two distributions. A target candidate most similar to the initial target model should have the smallest distance value. Minimizing the Bhattacharyya distance $d = (1-\rho(y))^{0.5}$ is equivalent to maximizing the Bhattacharyya coefficient $\rho(y)$. Using Taylor expression around the value $p_u(y_0)$, the linear approximation of the Bhattacharyya coefficient is obtained as:

$$\rho[p(y), q] \approx \frac{1}{2}\sum_{u=1}^{m} \sqrt{p_u(y_0)q_u} + \frac{1}{2}\sum_{u=1}^{m} p_u(y)\sqrt{\frac{q_u}{p_u(y_0)}}. \quad (4)$$

Apply Bayes rule to Eq.(4) may lead to the following equation:

$$\rho[p(y), q] \approx \frac{1}{2} \sum_{u=1}^{m} \sqrt{p_u(y_0) q_u} + \frac{C_h}{2} \sum_{i=1}^{n_h} w_i k\left(\left\|\frac{y - x_i}{h}\right\|^2\right), \quad (5)$$

$$\text{where } w_i = \sum_{u=1}^{m} \sqrt{\frac{q_n}{p_u(y_0)}} \delta[b(x_i) - u]. \quad (6)$$

To minimize the distance, the second term may be maximized, with the first term being independent of y. The kernel is recursively moved from the current location $y_0$ to the new location $y_1$ according to the relation:

$$y_1 = \frac{\sum_{i=1}^{n_h} x_i w_i g\left(\left\|\frac{y_0 - x_i}{h}\right\|^2\right)}{\sum_{i=1}^{n_h} w_i g\left(\left\|\frac{y_0 - x_i}{h}\right\|^2\right)}, \quad (7)$$

where $g(x) = -k(x)$. The definitions of the these equations are illustrated by D. Comaniciu et al. in "Kernel-based object tracking," *IEEE Trans. Pattern Analysis and Machine Intelligence*, vol. 25, no. 5, pp. 564-577, May 2003. Mean shift is a recursive method and the recursive time for each tracking process is usually small. However, the initial state of each process is based on the last tracking result. Under certain conditions, the approach may cause error propagation, especially when the previous tracking result is not correct or accurate.

Particle filter technique represents a different approach. As an example, the technique may involve choosing new target candidates from the previous target candidates based on their weights in the preceding frame. Target candidates with high weights may be repeatedly selected so that a candidate with a higher weight may be chosen more than one time. Additionally, those new target candidates are updated with some feature vectors to ensure that they would be more similar to the initial target model and to give them suitable weights according to their similarity to the initial target model. Finally, the tracking result usually includes the target candidates and their weights, which would be used in next frame for choosing new target candidates.

Assume that $x_t$ represents the modeled object at time t and the vector $X_t = \{x_1, \ldots, x_t\}$ is the history of the modeled object. In the same way, $z_t$ is the set of image features at time t and the history set of image features is $Z_t = \{z_1, \ldots, z_t\}$. Observations $z_t$ are assumed to be independent, both mutually and with respect to the dynamical process. This may be expressed probabilistically as follows:

$$p(Z_{t-1}, x_t | X_{t-1}) = p(x_t | X_{t-1}) \prod_{i=1}^{t-1} p(z_i | x_i). \quad (8)$$

The conditional state-density $p_t$ at time t may be:

$$p_t(x_t) = p(x_t | Z_t). \quad (9)$$

Apply Bayes rule to Eq.(9) may lead to the following equation:

$$p(x|z) = k p(z|x) p(x). \quad (10)$$

In one example, because the probability p(z|x) is sufficiently complex so p(z|x) cannot be evaluated simply in a closed form, iterative sampling techniques may be used. We generate a random variant x from a distribution p(x) that approximates the posterior p(z|x). First, a sample-set $\{s_1, \ldots, s_n\}$ is generated from the prior density p(x) with probability $\pi_i$, where $$\pi_i = \frac{p_z(s_i)}{\sum_{j=1}^{N} p_z(s_j)} \text{ and } p_z(x) = p(z | x). \quad (11)$$

The value $x_t$ chosen in this fashion has a distribution which approximates the posterior p(x|z) increasingly accurately as N increase. The steps identified below illustrate an example of an iterative procedure of a particle filter approach. A similar example is described by K. Nummiaro et al. in "An adaptive color-based particle filter," *Image and Vision Computing*, vol. 21, pp. 99-110, 2003.

---

Given the sample set $S_{t-1}$ and initial object model.
1. Select N samples from the set $S_{t-1}$ with weight $\pi_{t-1}$:
   (a) Calculate the nomalized cumulative probabilities $C_{t-1}^1$, let $C_{t-1}^0 = 0$ and $C_{t-1}^n = C_{t-1}^{(n-1)} + \pi_{t-1}^{(n)}$.
   (b) Generate a random number $r \in [0,1]$.
   (c) Find the smallest j for which $C_{t-1}^j > r$.
   (d) Set $s_t^{(n)} = s_{t-1}^j$.
2. Update target candidate states with some feature vectors.
3. Give suitable weight for new candidate according to the similarity between initial target model and candidate.

4. Estimate the mean state of the set $S_t$, $E[S_t] = \sum_{n=1}^{N} \pi_t^{(n)} s_t^{(n)}$.

---

Compared with the mean shift technique, the tracking results of a particle filter technique are updated during tracking process based on the target candidates instead of the last tracking results. In general, particle filter technique may present a more robust object tracking method when many target candidates are used. However, depending on the implementation, it may increase the computational complexity and require a tradeoff between efficiency and accuracy.

A hybrid tracker technique combining mean shift and particle filter was also proposed. The first step of this technique is to generate target candidates and re-sample these candidates. The second step applies mean shift technique independently to each target candidate until all target candidates are stabilized. The third step recalculates the weight for each target candidate using Bhattacharyya distance. Finally, the average is calculated to obtain tracking result. Because all target candidates are stabilized, the number of target candidates could be reduced without losing accuracy.

BRIEF SUMMARY OF THE INVENTION

Examples consistent with the invention may provide an object tracking method. The method may include: receiving frames of data containing image information of an object; performing an object segmentation to obtain an object motion result; and using the object motion result to conduct an object tracking. In particular, the object segmentation may include: extracting motion vectors from the frames of data; estimating a global motion using the motion vectors; and subtracting the global motion from the motion vectors to generate an object motion result.

Examples consistent with the invention may provide another object tracking method. The method may include: receiving frames of data containing information of an object; performing an object segmentation based on motion vectors of the series of frames of data to generate an object segmentation result with the effect of an estimated global motion removed from the object segmentation result; and conducting a similarity analysis of the object segmentation result and an initial object model.

Examples consistent with the present invention may also provide an object tracking system, the system may include: a data receiving device for receiving frames of data containing image information of an object; an object segmentation processor for performing an object segmentation; and an object tracking processor for conducting an object tracking based on the object motion result. In particular, the object segmentation performed by the object segmentation processor may include: extracting motion vectors from the frames of data; estimating a global motion using the motion vectors; and subtracting the global motion from the motion vectors to generate an object motion result.

BRIEF DESCRIPTION OF THE DRAWINGS

The above summary, as well as the following detailed description of a preferred embodiment of the invention, will be better understood when read in conjunction with the following drawings. For the purpose of illustrating the invention, there is shown in the drawings illustrative examples of the invention. It should be understood that the invention is not limited to the precise arrangements and instrumentalities shown. In the drawings.

DETAILED DESCRIPTION OF THE INVENTION

Figure 1:
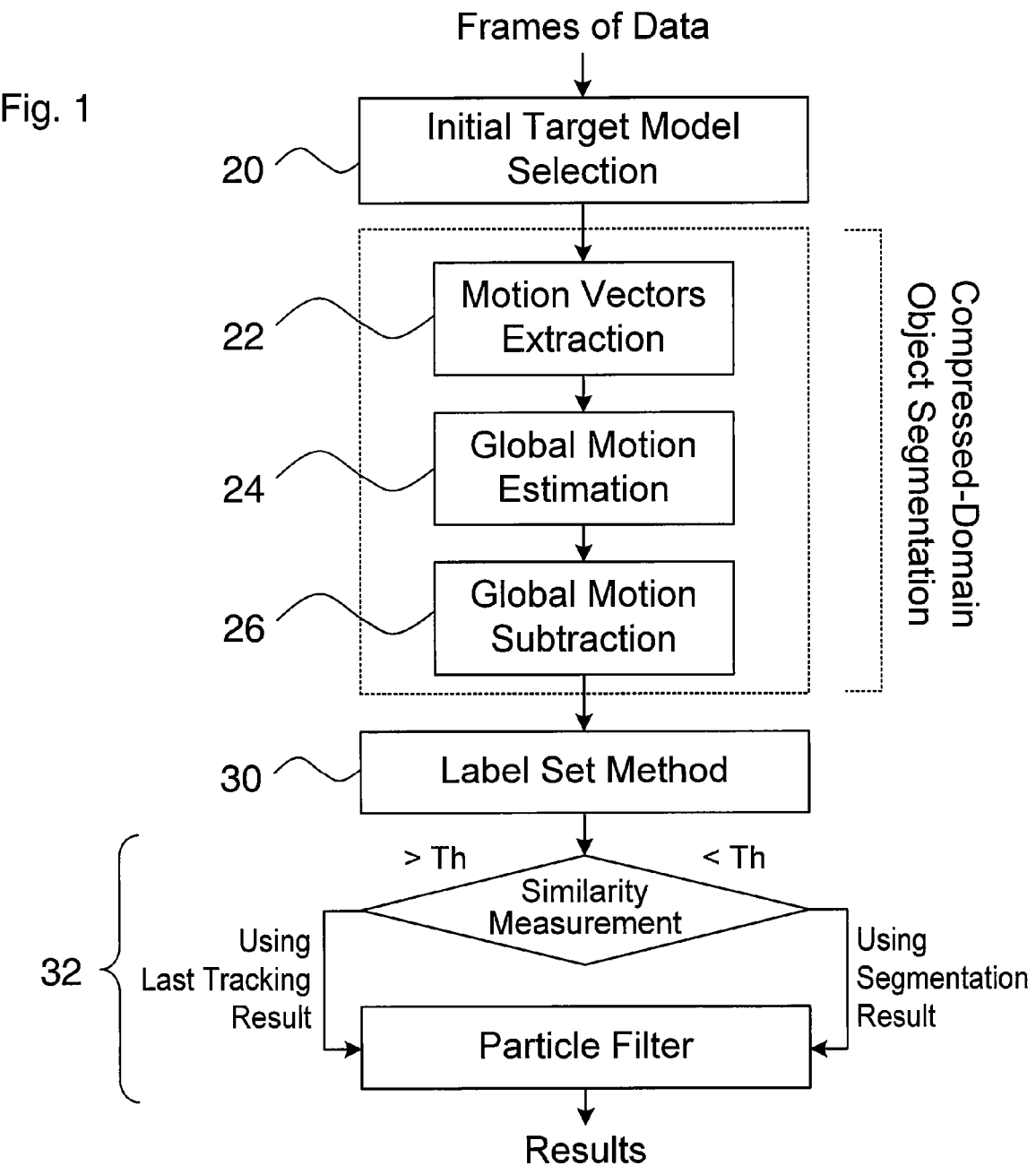
FIG. 1 below illustrates an exemplary flow chart of an object tracking method in examples consistent with the invention.

Certain terminology is used herein for convenience only and is not to be taken as a limitation on the present invention. In the drawings, the same reference letters are employed for designating the same elements throughout the several figures.

Examples of the invention provide segmentation-guided object tracking systems and methods. An exemplary method combines compressed-domain motion-based segmentation and particle filtering for tracking one or more objects. In one example, global motion parameters may be estimated to distinguish local object movements from camera movements so as to obtain a rough object mask. Based on the rough segmentation results, a particle filter may be used with a small number of target candidates to refine the tracking results.

In some examples, compressed-domain segmentation based on motion vectors is first performed to obtain the rough segmentation masks of the moving objects. Because the segmentation method may be based on motion vectors, it can avoid the possible confusion due to the cluttered scenes. A label set method may then be used to determine the number of objects and the corresponding location of each object in each frame. After the rough segmentation process, the similarity between the extracted object(s) and the initial target model may be calculated to determine the reliability of the segmentation result. If the segmentation result is considered reliable, the starting state of tracking method is based on the segmentation result. Otherwise, the object is supposed to be static and we may use the last tracking result as the beginning state. Guided with a reliable initial object location, the method needs only a much smaller number of target candidates for applying a particle filter approach to reach a tracking result. In some examples, this reduces the computational complexity of a system without sacrificing the robustness of the tracking results.

FIG. 1 below illustrates an exemplary flow chart of an object tracking method in examples consistent with the invention. As a part of an object tracking process, frames of data containing image information of one or more objects may be received. The frames of data may include a number of still images or a video sequence. Referring to FIG. 1, one or more elliptical regions may be selected as initial target model(s). The object tracking method may then perform an object segmentation process. In some examples, the objection segmentation process is performed at a compressed domain, which allows a system to reduce computation complexity especially when the frames of data contain compressed-domain information. In one example, the segmentation process may include: extracting motion vectors from the frames of data; estimating a global motion using the motion vectors; subtracting the global motion from the motion vectors; and obtaining an object motion result.

Referring to the example illustrated in FIG. 1, at step 20, some regions in the frames of data may be selected as target models. At step 22, motion vectors may be extracted from the frames of data. For the frame data in a compressed domain, the data themselves may already be in the form of motion vectors, and a system may eliminate the need of recalculating motion vectors from the frame date in some examples. In one example, the frames of data may belong to a portion of a compressed video stream and performing the object segmentation may include performing the object segmentation in a compressed domain. At step 24, a global motion may be estimated by using the motion vectors obtained from step 22. In one example a global motion may be estimated by distinguishing local object movements or motions from the movements or motions of a camera or an image capturing device itself. In one example, the estimate of a global motion may include applying a simplified affine motion model, which is further illustrate below, to process the motion vectors. After obtaining the estimated global motion, the global motion may be subtracted from the motion vectors at step 26. As an example, subtracting the estimated global motion from the motion vectors may generate a set of results that has little or no effects from the global motion, such as the motion of a moving, rotating, or panning camera itself. The elimination of or compensation for global motion effects may reduce the computation time or complexity of a system in identifying a global motion in addition to identifying an object motion. With steps 22, 24, and 26, an object motion result may be generated. The set of object motion results in pixel or block units may represent a rough object mask. At step 32, the result from the object segmentation may be used for facilitating an object tracking operation, such as an operation using a particle filter technique. In some examples, a similarity analysis may be conducted between sampling points identified based on the result from the object segmentation and an initial target model of the frames of data. And the results from the object segmentation may be refined by applying a particle filter technique.

In some examples, when multiple objects are being tracked, the method illustrated in FIG. 1 may include additional step 30 for performing a label set process, which may occur after obtaining the object motion results. Specifically, the label set process may include setting labels to different objects so as to distinguish a first object from a second object or other objects for conducting multiple-object tracking. In one example of a label set method, a unique label may be firstly assigned to each object in a frame. Two indices, SOC (Sum Of Column) and SOR (Sun Of Row) as defined in Eq.(12), may be used to establish the relationship between two object labels from different label sets.

$$SOC_j = \sum_{i=1}^{N_c} R_{ij}, \, j = 1, \ldots, N_p;$$

$$SOR_i = \sum_{j=1}^{N_p} R_{ij}, \, j = 1, \ldots, N_c,$$

(12)

where $N_c$ and $N_p$ represent the numbers of objects in the current and previous frames, respectively. The value of $R_{ij}$ would become 1 if object i and object j in two consecutive frames overlap with each other; otherwise $R_{ij}$ would be 0. Table 1 below illustrates an example of the SOC and SOR values corresponding to different object states, includes an object leaving a frame, an object entering a frame, merging of multiple objects into a single object, and splitting of one object into multiple objects.

TABLE 1

| Condition | State |
|---|---|
| $SOR_i = 0$ | A new object i enters the current frame |
| $SOC_j = 0$ | Object j leaves the current frame |
| $SOR_i \geq 2$ | Multiple objects merge into object i |
| $SOC_j \geq 2$ | Object j is split into multiple objects |
| $SOR_i = 1$ and $SOC_j = 1$ | Object i and object j are the same object |

In one example, after receiving a compressed video stream, such as one in an MPEG-4 or other compressed formats, a system may extract block motion vectors from the compressed video to perform object segmentation. The block size in one example is 8×8. A simplified affine motion model may be applied to estimate global motion from these motion vectors. In one example, the simplified affine model is modeled by four parameters, i.e. (a, b, c, d), and it can be written as $$\begin{bmatrix} x' \\ y' \end{bmatrix} = \begin{bmatrix} a & -b \\ -b & a \end{bmatrix} \begin{bmatrix} x \\ y \end{bmatrix} + \begin{bmatrix} c \\ d \end{bmatrix},$$

(13)

wherein the parameters a and b control the scaling and rotation, c and d control the translation, and (x, y) and (x',y') respectively represent the position in the previous and current frames.

In one example, it is assumed that a total of M motion vectors with corresponding positions $(x_i, y_i)$ and $(x_i', y_i')$, i=1, ..., M, in adjacent frames are provided to the affine motion model to estimate the four parameters by solving the following over-determined linear system:

$$\begin{bmatrix} x_1 & -y_1 & 1 & 0 \\ \vdots & \vdots & \vdots & \vdots \\ x_M & -y_M & 1 & 0 \\ y_1 & x_1 & 0 & 1 \\ \vdots & \vdots & \vdots & \vdots \\ y_M & x_M & 0 & 1 \end{bmatrix} \begin{pmatrix} a \\ b \\ c \\ d \end{pmatrix} = \begin{bmatrix} x_1 + u_1 \\ \vdots \\ x_M + u_M \\ y_1 + v_1 \\ \vdots \\ y_M + v_M \end{bmatrix}.$$

(14)

Motion vectors with global motion and local motion vectors may be used to estimate the four parameters. Because of local motion, it would make the parameters of affine motion model incorrect. In the least squares algorithm, we may apply the least squares estimation first and then compute the fitting errors $U_i = ax_i - by_i + c - x_i$, $V_i = ay_i + bx_i + d - y_i$ for every data point. The standard deviation of error statistics is used to identify the data points as outliers and discard the outliers from the data set. This process can be repeated until there is no new outlier being identified. Thus, the converged motion parameters may represent the global motion, such as the motion of a moving or rotating camera, well. Using the known the global motion, we may extract object motion(s) for each block. Finally, a system may cluster the object segmentation results for multi-object tracking, which may be characterized as the label set process described above.

As illustrated above, a similarity analysis may be applied to evaluate the correctness of object segmentation result to measure the similarity between the segmentation region and the initial target model. In one example, the color histogram is used to characterize the target objects. The Bhattacharyya distance is used to measure the similarity between two color histogram distributions. If the Bhattacharyya distance between the two distributions of the segmented object and the initial object model is less than a threshold, the segmentation is considered reliable. Otherwise, the result may be regarded as unreliable or less reliable. The threshold for determining the correctness of segmentation results can be obtained empirically. As an example, a threshold value of 0.425 may be used. Because the segmentation result is larger than object area, we may randomly select N target candidates having a radius larger than that of the initial target model. The number N=15 is used in exemplary computer simulations.

In one example, we may apply a particle filter to refine the tracking results. A small number of target candidates may be used because a rough segmentation result has been obtained. It randomly selects N target candidates according to segmentation results if the results are correct. In contrast, the last tracking results are referred to if the segmentation results are incorrect. The number of target candidates here may be obtained empirically.

In some examples, a system may be designed or configured to perform object tracking based on the exemplary methods illustrated above. For example, an object tracking system may include a device, such as a data receiving interface, for receiving frames of data in a coded format containing image information of an object; an object segmentation processor for performing an object segmentation; and an object tracking processor for conducting an object tracking based on the object motion result. As an example, the coded format may be any of the formats that compress raw or original data of images or video in a format that reduces the size of the original data. In one example, format such as one of the MPEG (Motion Picture Expert Group) standards, mpg, mov, rm, wmv, etc. may be used.

Figure 2:
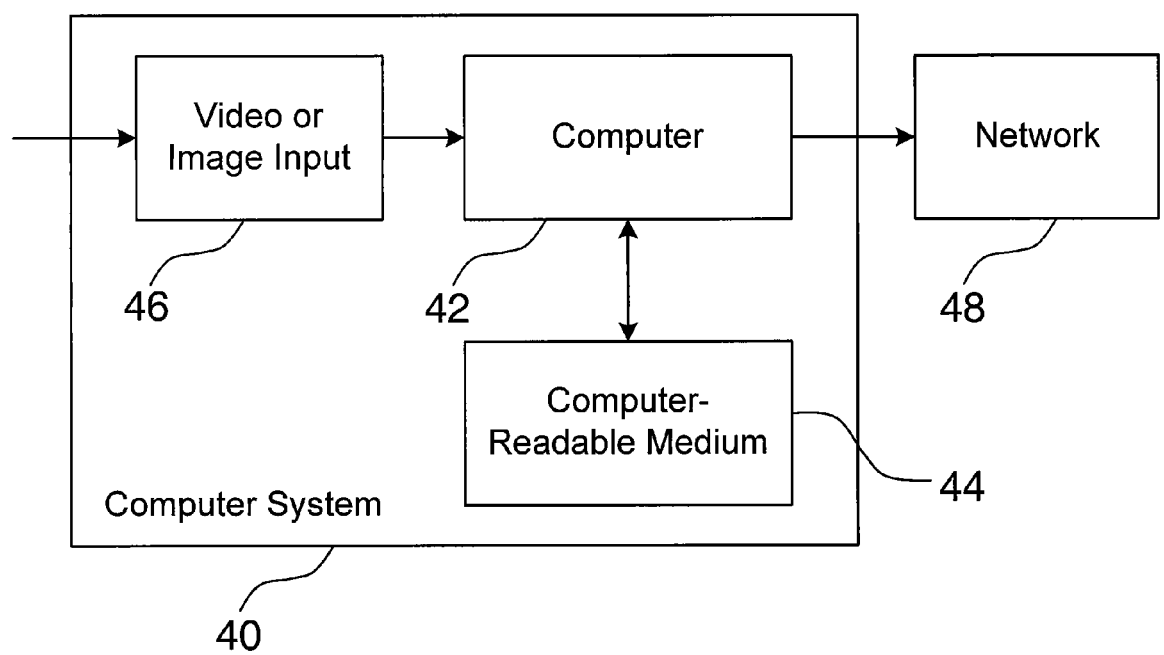
FIG. 2 illustrates a system capable of performing object tracking in examples consistent with the present invention.

Specifically, as an example, one or more steps of the method described above can be implemented with a system, such as a computer system or a system having a processor. FIG. 2 illustrates an exemplary processing or computer system 40, which includes processor or computer 42 and processor- or computer-readable medium 44, which may store software, firmware, instructions or other information for computer 42. In one example, one or more steps of steps 20-32 illustrated in FIG. 1 may be implemented with software residing in computer-readable medium 44. Video and/or images to be processed with the invention can reside on one or more computer-readable medium 44 or be provided, for example, via video or image input 46 or the network 48.

Accordingly, a data receiving interface, which is for receiving frames of data containing image information of an object, can be one of video or image input 46, an interface with network 48, or an interface with computer-readable medium 44. And an object segmentation processor, which is for performing an object segmentation, can be implemented with processor or computer 42. In one example, processor or computer 42 may be configured, by hardware, software, firmware, or processor instructions, to perform functions such as extracting motion vectors from the frames of data; estimating a global motion using the motion vectors; and subtracting the global motion from the motion vectors to generate an object motion processor. An object tracking processor, which is for conducting an object tracking based on the object motion result, can also be implemented with processor or computer 42.

Specifically, the object segmentation done by the object segmentation processor may include: extracting motion vectors from the frames of data; estimating a global motion using the motion vectors; and subtracting the global motion from the motion vectors to generate an object motion result. In some examples, the object segmentation processor may estimate the global motion by distinguishing local object motions from camera motions to derive a rough object mask, as illustrated above. Also, the object segmentation processor may estimate the global motion by applying a simplified affine motion model to process the motion vectors. In some examples, the object segmentation processor may further perform a label set process after generating the object motion result. Specifically, the label set process may include distinguishing the object from a second object for conducting multiple-object tracking. Similar to the method illustrated above, the object tracking processor may conduct the object tracking by performing a similarity analysis between sampling points identified based on the object motion result and an initial object model of the frames of data. Also, the object tracking processor may conduct the object tracking by refining the object motion result by applying particle filtering. As described above, in one example, the frames of data may belong to a portion of a compressed video stream and the object segmentation processor may perform the object segmentation in a compressed domain.

The object tracking system as illustrated above may be configured in various ways. For example, the object segmentation processor and the object tracking processor each may be implemented with an embedded processor or a function-specific hardware. Alternatively, one or both of the object segmentation processor and the object tracking processor may be implemented with one processor, such as a single processor configured with instructions to perform one or both of the object segmentation and the object tracking functions.

Figure 3:
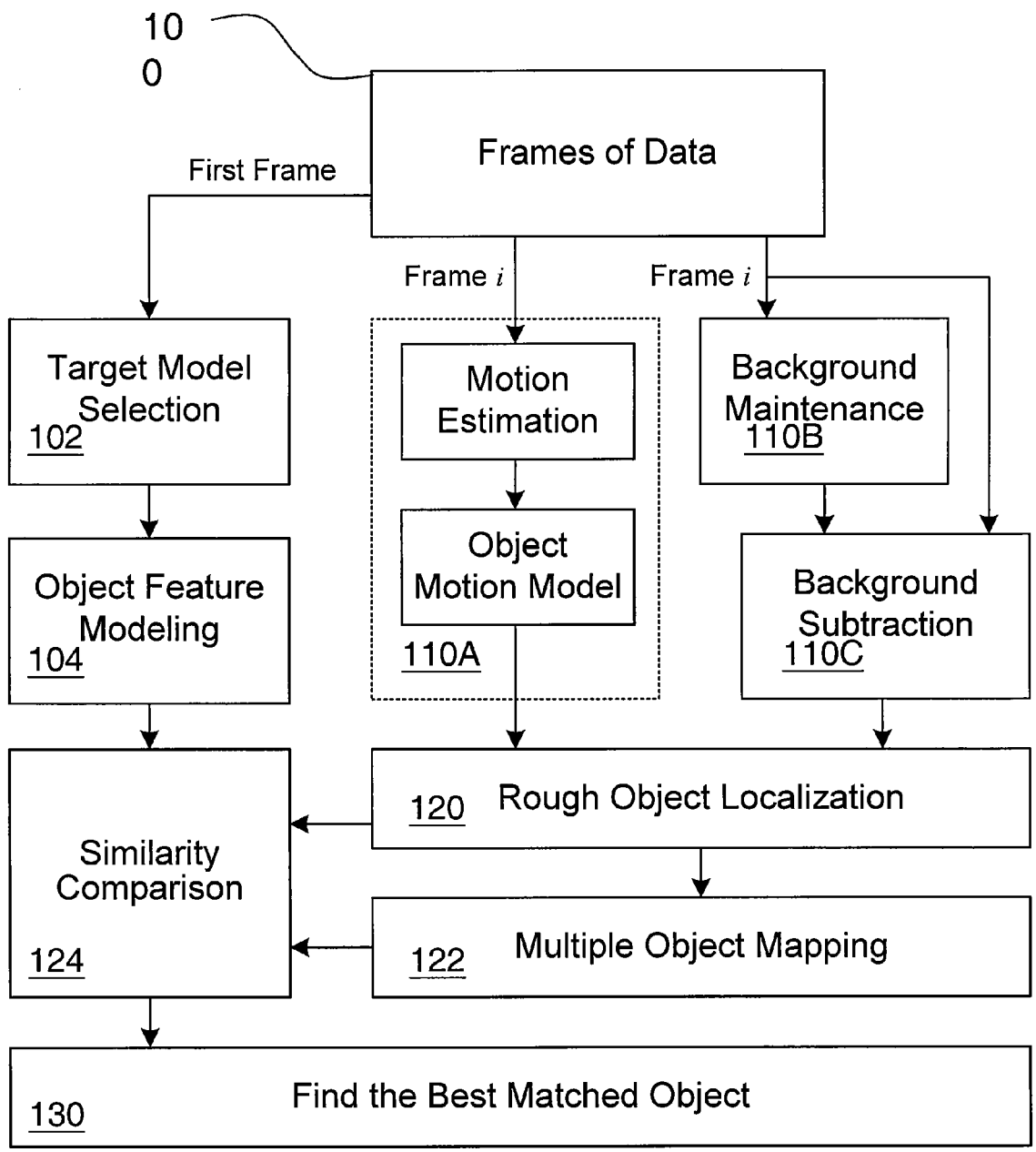
FIG. 3 illustrates another system capable of performing object tracking in examples consistent with the invention.

FIG. 3 illustrates another exemplary system for object tracking in examples consistent with the invention. The devices illustrated below may perform their processing as described below, or perform their processing using the some or all methods described above. Referring to FIG. 3, an object tracking system may have data receiving device 100 for receiving frames of data, which may be stored in device 100, and the frames of data may contain image information of one or more objects. An object segmentation processor 110A may perform an object segmentation process to obtain object motion results. In some examples, object segmentation processor 110A may be a device for compensating a global motion. In one example, object segmentation processor 110A may include a motion estimation device, which may estimate the global motion, and an object motion model device. The motion estimation device may extract motion vectors from the frames of data and use the motion vectors to estimate the global motion. The object motion model device may generate the object motion results by compensating the effect of the global motion, such as by subtracting the global motion from the motion vectors to generate the object motion result. Rough object localization device 120 may use the object motion result to conduct object tracking. In some examples, a number of estimated object movements or data points, which may be represented by vectors, may be placed and an analysis may be performed, such as by similarity comparison device 124, to identify or estimate the likely or rough object movement. In some other examples, the object motion result itself may be somewhat representative of rough object movements. As illustrated above, in one example, the frames of data may belong to a portion of a compressed video stream and performing the object segmentation comprises performing the object segmentation in a compressed domain.

Referring to FIG. 3, in some examples, the object segmentation process may also remove some or all background information that is less relevant to object tracking process. For example, background maintenance device 110B may update or obtain the background information in the frames of data, and background subtraction device 110C may subtract the background information from the frames of data, or from the object motion result from object segmentation device 110A. Similarly, rough object localization device 120 may use the result to conduct object tracking. Additionally, multiple object mapping device 122 may be optionally used in some examples to track two or more objects. For example, the label set process illustrated above may be used. In some examples, a number of estimated object movements for each of the separable objects, may be placed and an analysis may be performed, such as by similarity comparison device 124, to identify or estimate the likely or rough object movement for each of them.

Referring to FIG. 3, similarity comparison device 124 may perform a similarity analysis based on the result from rough object localization device 120 or multiple object mapping device 122. In one example, similarity comparison device 124 may conduct a similarity analysis between one or more sampling points identified based on the object motion result and an initial object model of the frames of data. In particular, an object feature modeling device 104 may generate the initial object model from the target selection device 102. In one example, the best matched object 130 may be located based on the similarity analysis.

Applying the technique identified above, we may use a few exemplary video sequences for performance evaluation. In particular, four video sequences respectively showing a swimming fish, two fruits, a transparent object, and a moving apple, and respectively including 39, 30, 46, and 15 frames are used in one example. Object tracking results using known means shift, particle filter, and hybrid tracker methods are also applied for comparison analysis. In one example, the implementation of separate methods were done by computer program codes coded using C language and those codes were executed with a computing system with a Pentium® 4 1.8G. Other types of implementations or systems may be used depending on various design, system, or cost considerations. In one example, the following equation is used for measuring the accuracy of tracking results:

$$d(M_t^{ref}, M_t^{track}) = \frac{\sum_{(x,y)} M_t^{ref}(x, y) \times M_t^{track}(x, y)}{\sum_{(x,y)} M_t^{ref}(x, y)} \in [0, 1], \quad (15)$$

where $M_t^{ref}$ represents the ground-truth of the tth frame, $M_t^{track}$ represents the tracked object masks of the tth frame, and (x, y) represent the index of a pixel.

Figure 4:
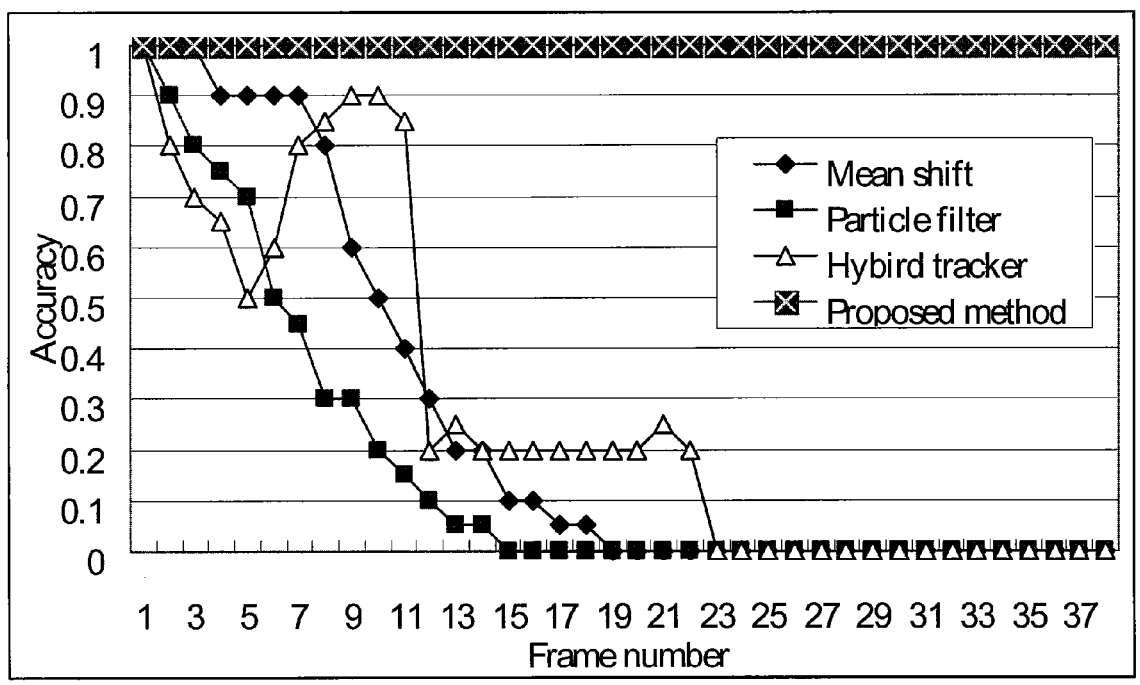
FIG. 4 shows the experimental results of four separate tracking methods for a Fish video sequence in an exemplary implementation.
Figure 5:
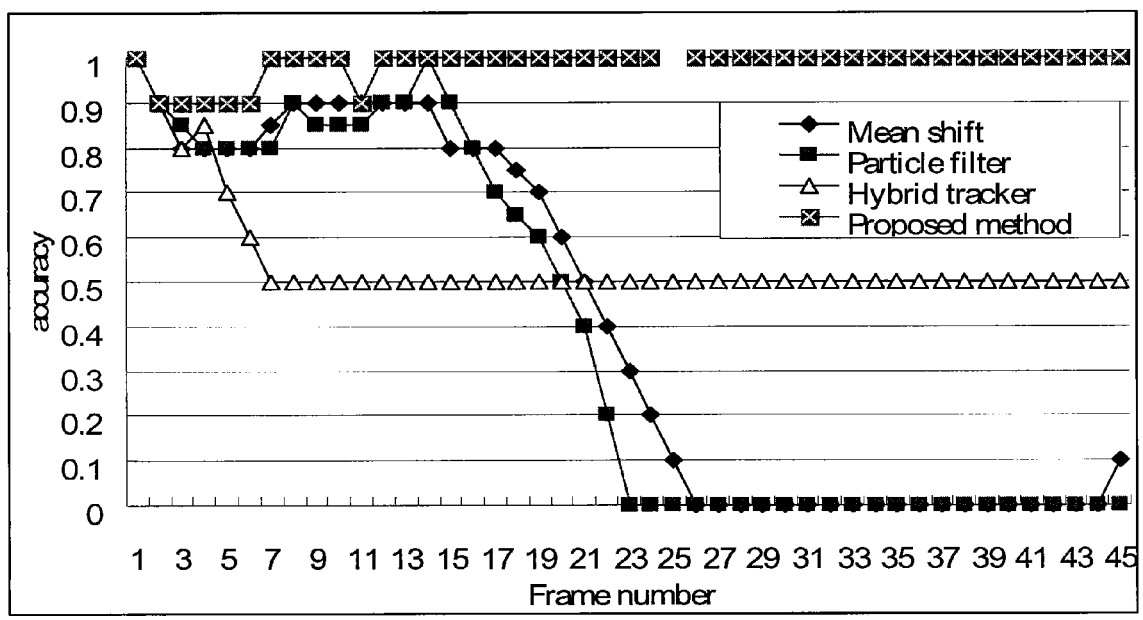
FIG. 5 shows the experimental results of four separate tracking methods for a Transparent Object video sequence in an exemplary implementation.
Figure 6:
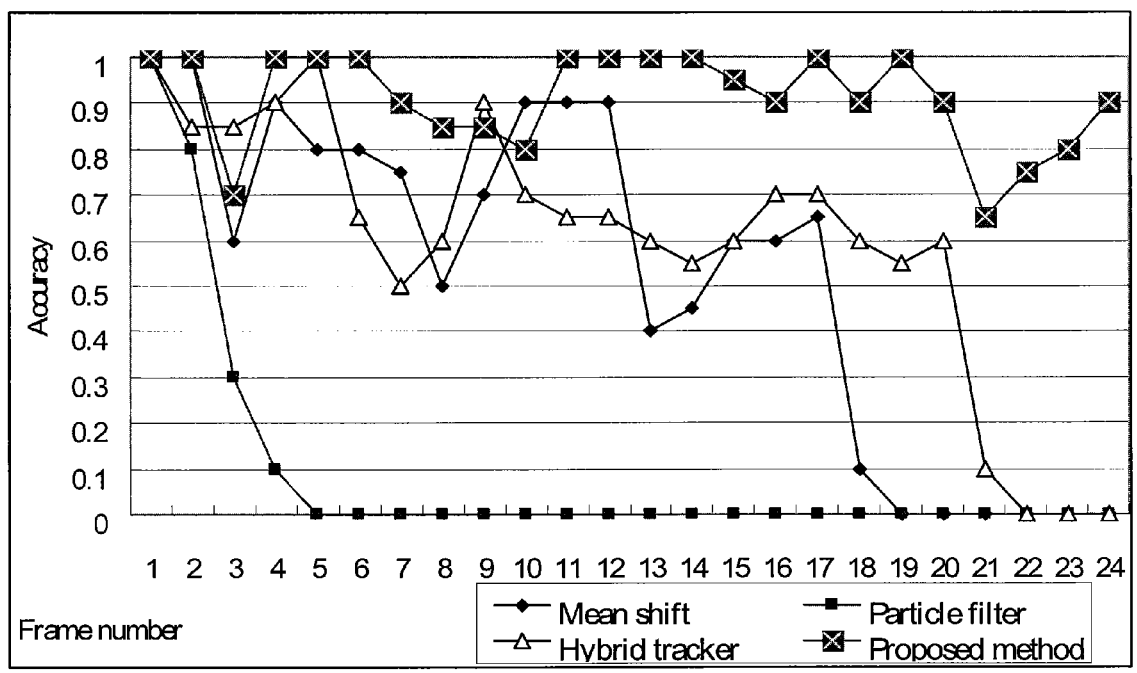
FIG. 6 shows the experimental results of four separate tracking methods for a Two Fruits video sequence in an exemplary implementation.
Figure 7:
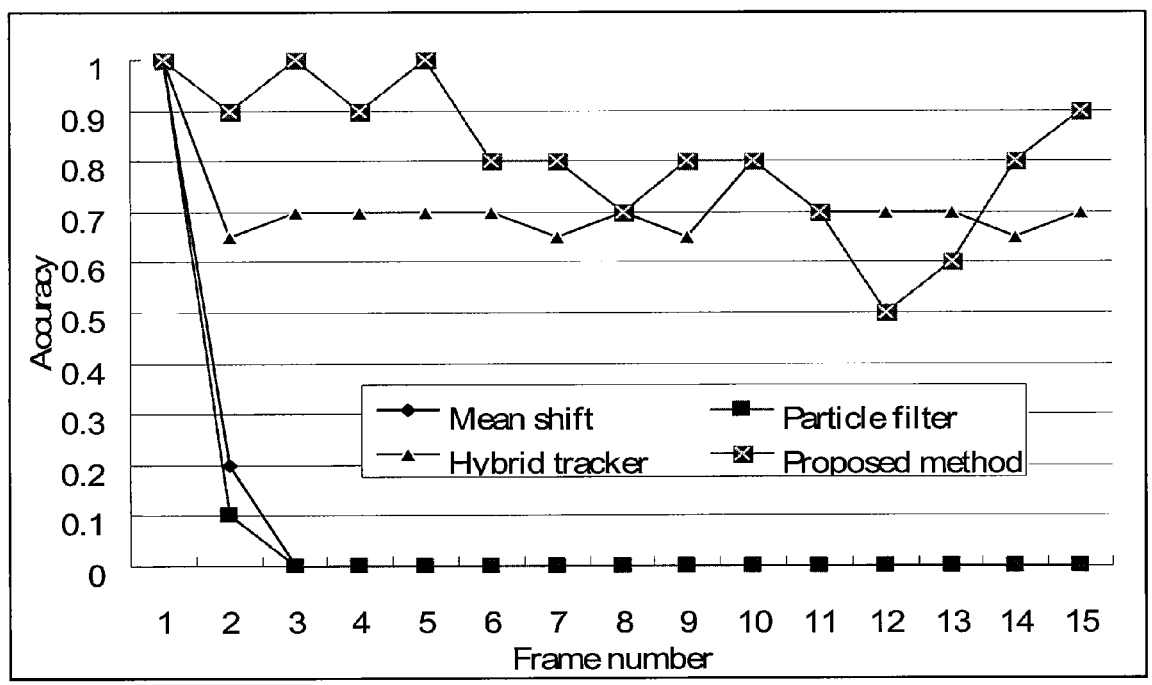
FIG. 7 shows the experimental results of four separate tracking methods for an Apple video sequence in an exemplary implementation.

FIG. 4 shows the experimental results of the four tracking methods for the Fish sequence. Referring to FIG. 4, a proposed implementation using the techniques illustrated above can track the object very well. In contrast, other methods could track the fish before the 23rd frame, but the tracking results are generally not as accurate and may deteriorate over time. FIG. 5 shows the experimental results of the four tracking methods for the Transparent Object sequence. Referring to FIG. 5, the proposed implementation and the hybrid tracker method can track the object fairly well compared to the other two techniques. However, the proposed method outperforms the hybrid tracker in tracking accuracy for most of the frames. FIG. 6 shows the experimental results of the four tracking methods for the Two Fruits sequence. Referring to FIG. 6, the proposed implementation tracks the object with acceptable accuracy. In contrast, none of the particle filter, mean shift, and hybrid tracker methods performed well and each of them failed to track the object after a certain number of frames. FIG. 7 shows the experimental results of the four tracking methods for the Apple sequence. Referring to FIG. 7, both the proposed implementation and the hybrid tracker method can track object fairly well, while the other two methods cannot. In one example, the exemplary implementation may perform worse than the hybrid tracker method near the 12th frame due to bad segmentation results, but the tracking result generally outperforms the hybrid tracker method over time.

Table 2 below illustrates an example for comparing the average computation time of four tracking methods for all of the test sequences. A larger frame-per-second value generally suggests a better performance speedwise. As illustrated by Table 2, the mean shift may be the fastest one among four methods. However, the experiments discussed above suggested that the object tracking capability of mean shift is poor. In contrast, the proposed implementation may provide fairly well tracking capability and is generally faster than particle filter and hybrid tracker methods in this example.

TABLE 2

| Method | Mean shift | Particle filter | Hybrid tracker | Proposed method |
|---|---|---|---|---|
| Frame per second | 19.01 | 2.00 | 5.42 | 6.33 |

As illustrated above, examples of the invention provide segmentation-guided object tracking methods and systems. In one example, the motion vectors are firstly extracted as features from compressed-video for video object segmentation. The global motion operation is performed using the extracted motion vectors to obtain a rough object mask. The proposed invention may measure the similarity between the segmentation result and an initial target model using Bhattacharyya distance to decide the value of beginning state. Finally, a particle filter with a relatively small number of target candidates may be used to refine the tracking result. Experimental results in one example suggest that an exemplary implementation using the proposed technique can achieve good tacking accuracy and reliability and may be comparable to or more advantageous than the mean shift, particle filter, and hybrid tracker methods.

It will be appreciated by those skilled in the art that changes could be made to the examples described above without departing from the broad inventive concept thereof. It is understood, therefore, that this invention is not limited to the particular examples disclosed, but it is intended to cover modifications within the spirit and scope of the present invention.

We claim:

1. An object tracking method comprising:
receiving frames of data containing compressed-domain image information of an object;
performing an object segmentation using the compressed-domain image information, the object segmentation comprising:
extracting motion vectors from the frames of data;
estimating a global motion using the motion vectors; and
subtracting the global motion from the motion vectors to generate an object motion result; and
using the object motion result to conduct an object tracking, wherein using the object motion result comprises conducting a similarity analysis between sampling points identified based on the object motion result and an initial object model of the frames of data.

2. The method of claim 1, wherein estimating the global motion comprises distinguishing local object motions from camera motions to derive a rough object mask.

3. The method of claim 1, wherein estimating the global motion comprises applying a simplified affine motion model to process the motion vectors.

4. The method of claim 1, further comprising performing a label set process after generating the object motion result, wherein performing the label set process comprises distinguishing the object from a second object for conducting multiple-object tracking.

5. The method of claim 1, further comprising performing a label set process after generating the object motion result, wherein performing the label set process comprises clustering the object motion result.

6. The method of claim 1, further comprising refining the object motion result by applying particle filtering.

7. The method of claim 1, wherein the frames of data belong to a portion of a compressed video stream and performing the object segmentation comprises performing the object segmentation in a compressed domain.

8. An apparatus comprising a processor configured to perform or cause the apparatus to at least perform the following:
receiving frames of data in a coded format containing image information of an object;
performing an object segmentation, the object segmentation comprising:
extracting motion vectors from the frames of data;
estimating a global motion using the motion vectors; and
subtracting the global motion from the motion vectors to generate an object motion result; and
conducting an object tracking based on the object motion result, wherein conducting the object tracking comprises performing a similarity analysis between sampling points identified based on the object motion result and an initial object model of the frames of data.

9. The apparatus of claim 8, wherein estimating the global motion comprises distinguishing local object motions from camera motions to derive a rough object mask.

10. The apparatus of claim 8, wherein estimating the global motion comprises applying a simplified affine motion model to process the motion vectors.

11. The apparatus of claim 8, wherein the processor is further configured to perform or cause the apparatus to further perform a label set process after generating the object motion result, wherein performing the label set process comprises distinguishing the object from a second object for conducting multiple-object tracking.

12. The apparatus of claim 8, wherein conducting the object tracking comprises refining the object motion result by applying particle filtering.

13. The apparatus of claim 8, wherein the frames of data belong to a portion of a compressed video stream in the coded format and the object segmentation processor performs the object segmentation in a compressed domain.

14. The apparatus of claim 8 further comprising a memory storing executable instructions that in response to execution by the processor cause the processor or apparatus to perform the object segmentation and the object tracking.

15. A non-transitory computer-readable storage medium having computer-readable program code portions stored therein that in response to execution by a processor cause an apparatus to at least perform the following:
receiving frames of data containing compressed-domain image information of an object;
performing an object segmentation using the compressed-domain image information, the object segmentation comprising:
extracting motion vectors from the frames of data;
estimating a global motion using the motion vectors; and
subtracting the global motion from the motion vectors to generate an object motion result; and
using the object motion result to conduct an object tracking, wherein using the object motion result comprises conducting a similarity analysis between sampling points identified based on the object motion result and an initial object model of the frames of data.

16. The non-transitory computer-readable storage medium of claim 15, wherein estimating the global motion comprises distinguishing local object motions from camera motions to derive a rough object mask, or applying a simplified affine motion model to process the motion vectors.

17. The non-transitory computer-readable storage medium of claim 15, wherein execution of the computer-readable program code portions by the processor further causes the apparatus to perform a label set process after generating the object motion result, wherein performing the label set process comprises distinguishing the object from a second object for conducting multiple-object tracking, or clustering the object motion result.

18. The non-transitory computer-readable storage medium of claim 15, further comprising refining the object motion result by applying particle filtering.

19. The non-transitory computer-readable storage medium of claim 15, wherein the frames of data belong to a portion of a compressed video stream and performing the object segmentation comprises performing the object segmentation in a compressed domain.

* * * * *